(12) United States Patent
Robinson et al.

(10) Patent No.: US 7,856,499 B2
(45) Date of Patent: Dec. 21, 2010

(54) AUTONOMIC PROVISIONING OF HOSTED APPLICATIONS WITH LEVEL OF ISOLATION TERMS

(75) Inventors: Philip Robinson, Newtownabbey (GB); Carsten Franke, Carrickfergus (GB)

(73) Assignee: SAP AG, Walldorf (DE)

( * ) Notice: Subject to any disclaimer, the term of this patent is extended or adjusted under 35 U.S.C. 154(b) by 323 days.

(21) Appl. No.: 12/051,864

(22) Filed: Mar. 20, 2008

(65) Prior Publication Data

US 2009/0238078 A1    Sep. 24, 2009

(51) Int. Cl.
*G06F 15/173*    (2006.01)
(52) U.S. Cl. .................. 709/226; 709/200; 709/223; 709/224; 709/229; 709/237
(58) Field of Classification Search .............. 709/200, 709/223, 224, 226, 229, 237
See application file for complete search history.

(56) References Cited

U.S. PATENT DOCUMENTS

| | | | |
|---|---|---|---|
| 2004/0064557 A1* | 4/2004 | Karnik et al. ............... | 709/225 |
| 2004/0267897 A1* | 12/2004 | Hill et al. .................. | 709/217 |
| 2005/0132041 A1* | 6/2005 | Kundu ...................... | 709/224 |
| 2005/0172291 A1* | 8/2005 | Das et al. .................. | 718/104 |
| 2006/0026010 A1 | 2/2006 | Van Moorsel et al. | |
| 2006/0206619 A1* | 9/2006 | Dan et al. .................. | 709/233 |
| 2007/0283016 A1* | 12/2007 | Pendarakis et al. ......... | 709/226 |

OTHER PUBLICATIONS

European Search Report for EP Application No. 09003755.7, mailed on Jul. 6, 2009, 8 pages.

M. Jankowski et al.; Virtual Environments—Framework For Virtualized Resource Access In The Grid; Euro-Par 2006: Parallel Processing; vol. 4375/2007, pp. 101-111 (http://www.springerlink.com/content/37712435774h273x/).

J. Denemark; Virtual Grid Execution Environment; Proceedings of MIPRO 2006 / Hypermedia and Grid Systems, pp. 227-231, 2006; publisher: Croation Society for Information and Communication Technology, Electronics and Microelectronics (http://www.muni.cz/research/publications/636868/).

Simon N. Foley et al.; Multilevel Security and Quality of Protection; Quality of Protection Security Measurements and Metrics; 2006; pp. 93-105, vol. 23; Springer US (http://www.cs.ucc.ie/~simon/pubs/qop2005.pdf).

Erica Y. Yang et al.; Virtual Organization Management in Xtreemos: An Overview; Towards Next Generation Grids; 2007; pp. 73-82; Springer US (http://www.dr-carsten-franke.de/coregrid07.pdf).

(Continued)

*Primary Examiner*—Liangche A Wang (57) ABSTRACT

A method and a system are described that involve autonomic provisioning of hosted applications with level of isolation terms. In one embodiment, the system includes an infrastructure registry to provide a set of heterogeneous infrastructure resources, an autonomic provisioning service unit to select a subset of the heterogeneous infrastructure resources, (the subset of resources to fulfill a service level agreement (SLA) with a corresponding level of isolation), and a monitoring unit to collect information about the subset of resources and send the collected information to the autonomic provisioning service unit.

In another embodiment, the method includes providing a set of heterogeneous infrastructure resources, selecting a subset of the set of heterogeneous infrastructure resources, the subset of heterogeneous infrastructure resources is defined in a configuration template to fulfill a service level agreement (SLA) with a corresponding level of isolation, and allocating the subset of infrastructure resources in the registry.

20 Claims, 5 Drawing Sheets

OTHER PUBLICATIONS

Stuart E. Madnick and John J. Donovan; Application and Analysis of the Virtual Machine Approach to Information System Security and Isolation; Proceedings of the workshop on virtual computer systems, 1973; pp. 210-224 (http://portal.acm.org/citation.cfm?id=800122.803961).

Alexander Keller and Heiko Ludwig; Defining and monitoring service-level agreements for dynamic e-business; Proceedings of the 16th USENIX conference on System administration, 2002; pp. 189-204 (http://portal.acm.org/citation.cfm?id=1050540).

Heiko Ludwig et al.; Reliable Orchestration of Resources using WS-Agreement; High Performance Computing and Communications; pp. 753-762 vol. 4208/2006; Springer Berlin/Heidelberg (http://www.springerlink.com/content/741836212334t315/).

Heiko Ludwig et al.; Template-Based Automated Service Provisioning—Supporting the Agreement-Driven Service Life-Cycle; Proceedings of the 3rd International conference on service-oriented computing, 2005, vol. 3826, pp. 283-295 (http://www.econbiz.de/archiv/ka/uka/information/service_provisioning_supporting.pdf).

Jiadao Li and Ramin Yahyapour; Learning-Based Negotiation Strategies for Grid Scheduling; Proceedings of the Sixth IEEE International Symposium on Cluster Computing and the Grid, 2006; pp. 576-583, http://www-ds.e-technik.uni-dortmund.de/~yahya/papers/cei_ccgrid2006.pdf.

Jiadao Li and Ramin Yahyapour; Negotiation Strategies for Grid scheduling; Proceedings of the First international conference, GPC 2006; vol. 3947, pp. 42-52 (http://cat.inist.fr/?aModele=afficheN&cpsidt=19104745).

Yvan Royon et al.; Virtualization of Service Gateways in Multi-provider Environments; Component-Based Software Engineering, 2006, pp. 385-392; Springer Berlin / Heidelberg (http://hal.inria.fr/docs/00/39/49/56/PDF/CBSE2006.pdf).

Shahram Ghandeharizadeh et al.; On configuring a single disk continuous media server; Proceedings of the 1995 ACM SIGMETRICS joint international conference on Measurement and modeling of computer systems; pp. 37-46, 1995 (http://portal.acm.org/citation.cfm?id=223587.223591).

Nick G. Duffield et al.; A flexible model for resource management in virtual private networks; Proceedings of the conference on Applications, technologies, architectures, and protocols for computer communication; pp. 95-108; 1999 (http://portal.acm.org/citation.cfm?id=316209).

Jeanna Neefe Matthews et al.; Quantifying the Performance Isolation Properties of Virtualization Systems; Proceedings of the 2007 workshop on Experimental computer science 2007; article 6 (http://portal.acm.org/citation.cfm?id=1281706).

Patrick Goldsack et al; SmartFrog: Configuration and Automatic Ignition of Distributed Applications; presented in 2003 HP Openview University Association conference; (http://www.hpl.hp.com/research/smartfrog/papers/SmartFrog_Overview_HPOVA03.May.pdf).

Alain Andrieux et al.; Web Services Agreement Specification (WS-Agreement), Open Grid Forum (2004-2007) (http://www.ogf.org/documents/GFD.107.pdf).

* cited by examiner

AUTONOMIC PROVISIONING OF HOSTED APPLICATIONS WITH LEVEL OF ISOLATION TERMS

FIELD OF INVENTION

Embodiments of the invention relate generally to the software arts, and, more specifically, to autonomic provisioning of hosted application with level of isolation terms defined in a service level agreement between a service provider and a service consumer.

BACKGROUND

Data centers provide services to customers accessible via the Internet. In the software world, the data centers act as service providers and the customers as service consumers. The service provider is not necessarily equivalent to the software provider. In many cases, a service provider and a software provider agree on certain conditions in which the service provider can offer the different software services to its customers. The services that the data centers provide may include hosting of applications and data.

The offered service is, in most cases, a composition of lower level services. Resources are dynamically allocated corresponding to the service specification and the customer requirements. A service level agreement (SLA) is a formally negotiated agreement between two parties. It is a contract that exists between customers and their service provider, or between service providers. It records the common understanding about services, priorities, responsibilities, guarantee, and such that is acceptable and deliverable by the parties involved—collectively, the level of service. Changing the resource allocation, the service composition, or the service usage may result in the customer or data center provider changing their perception of risk regarding their potential for service level agreements to be violated. These effects, combined with the high frequency of new service requests and the dynamics of the different services, make the management of data centers more and more difficult.

A data center's provisioning process incorporates many constraints, service characteristics, as well as the objectives of the data center provider and the objectives of the individual customers. One important aspect that needs to be better automated is protection, security and isolation of hosted application services.

In general, a customer's concerns regarding the protection of its hosted applications and data in a data center can be addressed in many ways. For example, some physical firewalls can be used to clearly disconnect dedicated servers running applications of different and maybe competing companies. As one can see, the different protection approaches correspond with different costs necessary to implement the specific protection mechanism. Thus, different customers at data centers will have different perceptions of the best trade-off solution between a high level of security and the related costs.

In order to establish a contract between the service provider and the customer in many business environments, the customers still need to sign paper-written contracts that clearly specify the provision of specific services and the corresponding behavior rules and costs for the service consumers. This becomes a bottleneck as the number of customer requests per time interval is constantly increasing. Thus, automatic mechanisms need to replace the manual negotiation and specification of the agreements. Additionally to the specification of SLAs, the negotiation between service providers and service consumers need to be automated. Again, driven by scientific applications, some approaches for negotiation protocols exist. However, these attempts again focus on the computational requirements for certain services and omit the customer's protection and security concerns.

SUMMARY

A computing system and method for autonomic provisioning of hosted applications with level of isolation terms are described. In one embodiment, the system includes an infrastructure registry to provide a set of heterogeneous infrastructure resources, an autonomic provisioning service unit to select a subset of the heterogeneous infrastructure resources, the subset of resources to fulfill a service level agreement (SLA) with a corresponding level of isolation, and a monitoring unit to collect information about the subset of resources and send the collected information to the autonomic provisioning service unit.

In one embodiment, the method includes providing a set of heterogeneous infrastructure resources, selecting a subset of the heterogeneous infrastructure resources (the subset of heterogeneous infrastructure resources is defined in a configuration template to fulfill a service level agreement (SLA) with a corresponding level of isolation), and allocating the subset of infrastructure resources.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of the invention relate to a system and method for autonomic provisioning of hosted applications with level of isolation terms agreed in a service level agreement (SLA) between a service provider and a service consumer.

In one embodiment, the service provider may be a data center with a plurality of infrastructure resources for hosting customers' applications and data. Any malicious or accidental occurrence in the data center that disrupts fulfillment of one or more terms in an SLA can be regarded as an SLA violation. The SLA violation can occur on physical or logical entities in the data center. Therefore, knowing the structure of a data center may help in defining the possible SLA violations that can occur on the elements of the structure.

Figure 1:
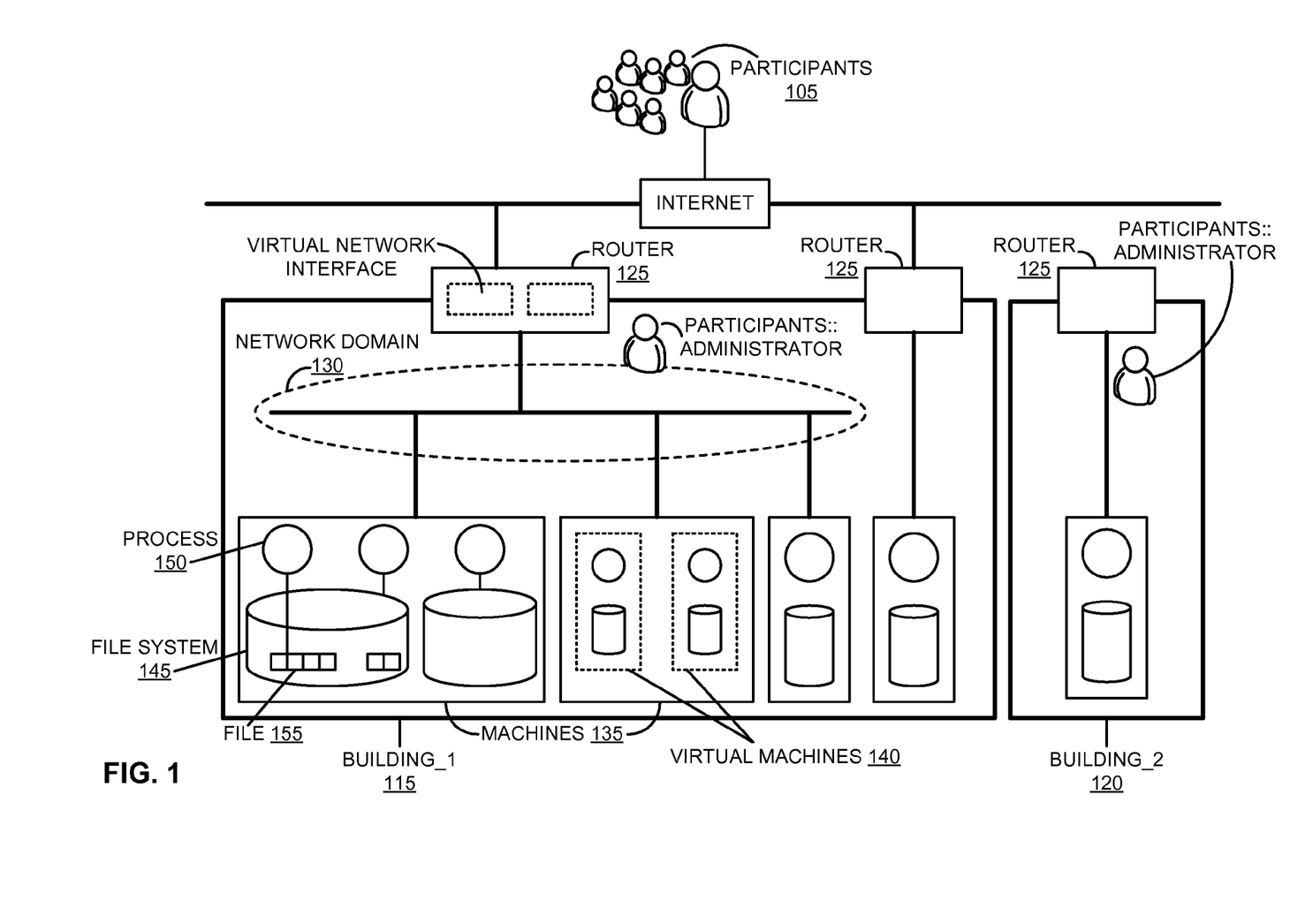
FIG. 1 is a block diagram of an embodiment of a data center and its entities.

FIG. 1 is a block diagram of an embodiment of a data center and its entities. Data center 100 is shown with respect to its participants 105. Participants 105 are human or organizational entities that include the roles of administrator, customer, and user. Participants 105 access different entities of the data center 100 through the Internet 110. Data center 100 may consist of several buildings such as building_1 115 and building_2 120. Building_1 115 and building_2 120 house one or more different, individual network routers 125. Routers 125 act as gateways to different network domains, such as network domain 130. Network domain 130 includes one or more physical machines 135. In addition, the network domain 130 may include several virtual machines 140 as well. Each of machines 135 hosts one or more elements, including application servers, file systems (e.g. file system 145), and databases, which subsequently contain processes 150, files 155, and data.

These elements define a structural model of the data center 100 that can help in analyzing the potential SLA violation sources and targets. This is used to classify different types of isolation mechanisms that could be employed to reduce the possibilities of these violations.

One of the entities in the data center 100 is participants 105. Participants 105 allow access to services of the data center 100 as specified in SLAs. The potential violation that may occur at this level is to abuse privileges to gain knowledge about other participants' data and applications, or block their access. Another entity of the data center 100 are facilities such as buildings (e.g., building_1 115 and building_2 120), rooms, server racks, cabinets, and cables. Physical damage on these may lead to loss of multiple items of hardware and service.

Violation may occur on hardware entities in the data center 100 as well. The hardware entities: servers, workstations, hard drives, tape drives, routers (e.g. router 125), and the like, may experience failure or destruction, which leads to unavailability of software. The software itself can also be treated as a risk element. Software entities may be virtual machines 140, application servers, database management systems, and operating systems. These may contain flaws or be compromised, causing alterations in normal behavior that corrupt and make data unavailable.

Another entity of data center 100 is data such as files 155, which may include documents, models, personal information, catalogues, certificates, namespaces, and the like. Any violation of the SLA on these leads to corrupted data and inaccurate information.

Hierarchical dependencies between the described violations are possible. For example, damage to facility entities will potentially lead to damaged hardware, hence corrupted software and hence lost data. Therefore, the risks of SLA violations vary depending on what infrastructure elements two different customers share to support their applications.

To protect the entities of the data center's architecture against such violations, several levels of isolation (LOI) can be defined. Each level of isolation is set-up to isolate and hence protect a particular entity and the data residing therein. In one embodiment, the level of isolation is included as an additional term in a service level agreement between a customer (e.g. participants 105) and the service provider (e.g. data center 100). The customer and the data center 100 negotiate the appropriate level of isolation and the corresponding costs. The negotiation of an SLA is a multi-step process in which the customer determines the best trade-off between the avoidance of perceived risk by choosing an appropriate LOI and the related costs caused by this LOI. An SLA includes a set of measurable terms that represent guarantees provided by the data center to a customer. The LOI, as part of the SLA terms, is associated with quantitative approximations of the related costs for isolation of particular infrastructure resources for providing the isolation guarantee.

Figure 2:
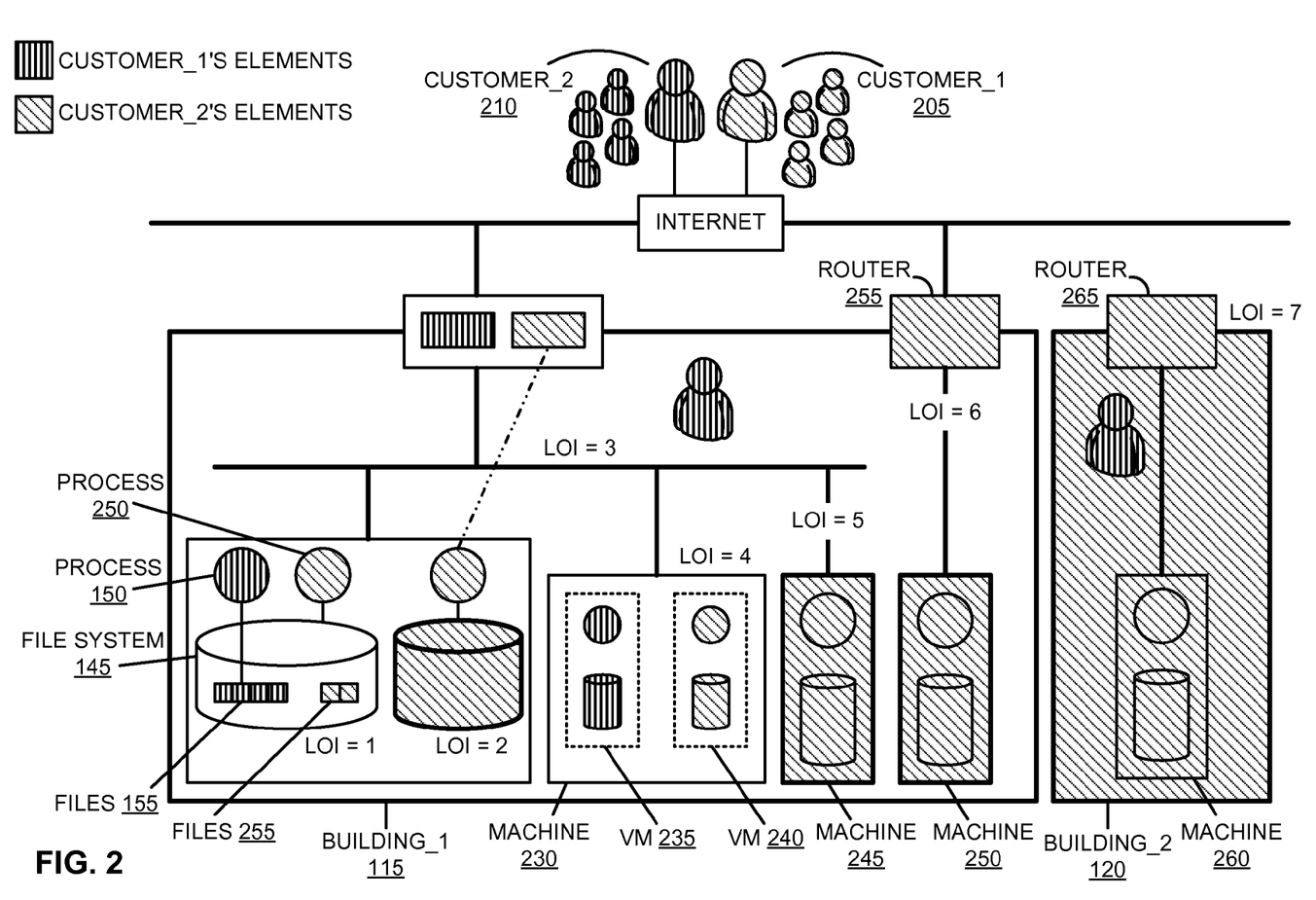
FIG. 2 is a block diagram of an embodiment for representing physical and virtual implementations of isolation in a data center.

FIG. 2 is a block diagram of an embodiment for representing physical and virtual implementations of isolation in a data center. Data center 100 provides infrastructure resources to two customers: customer_1 205 and customer_2 210. It should be appreciated that a data center can have multiple customers and customer_1 205 and customer_2 210 serve only as an example.

Depending on the complexity of a data center's architecture, a number of levels of isolation can be defined. For data center 100, the following exemplary levels are defined.

LOI 1—Naming isolation: objects and processes are associated with a namespace unique to the customer but may be stored in the same file system, use the same server instance and executed in same memory space. For example, process 150 and files 155 associated with customer_1 205 are hosted on the same file system 145 as process 250 and files 255 associated with customer_2 210. At this level, risks are highest as failure of one database or server instance affects many customers. Costs for this isolation are lowest as the same server instances and physical machines can be used to support several customers, given the capacities of the software and hardware.

LOI 2—Object isolation: objects are placed on a separate disk partition of a machine but processes of different customers are executed in the same physical or logical memory space. Database 215 and application 220 are running as a separate instance from file system 145 and processes 150 and 250. Risks are high as there is a mechanism for protecting against propagation of data compromise but not against execution or machine failure. Costs are low as physical resources are still shared and the partitioning mechanism is simple and does not significantly add to the overhead.

LOI 3—Virtual network isolation: processes and objects can only be accessed over a reserved virtual network interface, by multiplexing using encryption over the same interface. FIG. 2 shows the multiplexing of shared router 225 leading from buildings_1 115. Thus, each customer can communicate using a different logical subnet, interface and IP address. Risks are lower than for LOI 2 as there is better protection of customer's confidentiality, integrity and access control. Costs are higher than for LOI2 as there is a need to manage additional software (e.g. a virtual private network (VPN) server) and separate security contexts (ports and keys).

LOI 4—Virtual machine (VM) isolation: processes and objects are executed and stored in a separate logical memory space and partition of a machine. Machine 230 is shared by the processes and objects of customer_1 205 and customer_2 210. The processes and objects of customer_1 205 are running in VM 240. The processes and objects of customer_2 210 are running in VM 235. The risks are lower than LOI 3 as the propagation of failure or compromise of one VM is difficult without significant effort and privileged access. Costs are higher than LOI 3 as using these solutions includes having licenses for the software, as well as additional computational requirements placed on the underlying physical machines.

LOI 5—Hardware-machine isolation: processes and objects of a customer are stored on individual physical machines or on physically separated, stand-alone, computational units. These units can be accessible by the customer and possibly an administrator. Processes and objects of customer_1 205 only are hosted by a single machine 245. Risks are lower than for LOI 4 as physical isolation is used and machine failures are easier to isolate. Costs are higher than for LOI 4 as a data center may have thousands of customers and users and supporting this scenario means thousands of machines and even additional machines for fail-over scenarios and data archiving.

LOI 6—Physical network isolation: processes and objects of a customer are stored on a physical machine reserved only for that customer and connected to a physical gateway reserved for the customer. Machine 250 and router 255 are reserved only for the processes and objects of customer_1 205. Risks are lower than for LOI 5 as this is almost perfect level of isolation. Costs are higher than for LOI 5 as the customer's needs require an additional network of machines to be maintained.

LOI 7—Location isolation: resources reserved for a customer are stored in a separate physical room or building. Machine 260 and router 265 of customer_1 205 are hosted by building_2 120. Risks are lowest as there is no interference or dependence on other customers, for example customer_2 210. This is the perfect level of isolation. Costs are highest as an entire physical space and utilities are dedicated to customer_1 205.

The levels of isolation can be different than laid-out above, depending on data center's architecture. Each LOI represents a different configuration in response to perceived risk of SLA violation due to resource sharing. The costs of security are tightly connected with the calculated risk.

Figure 3:
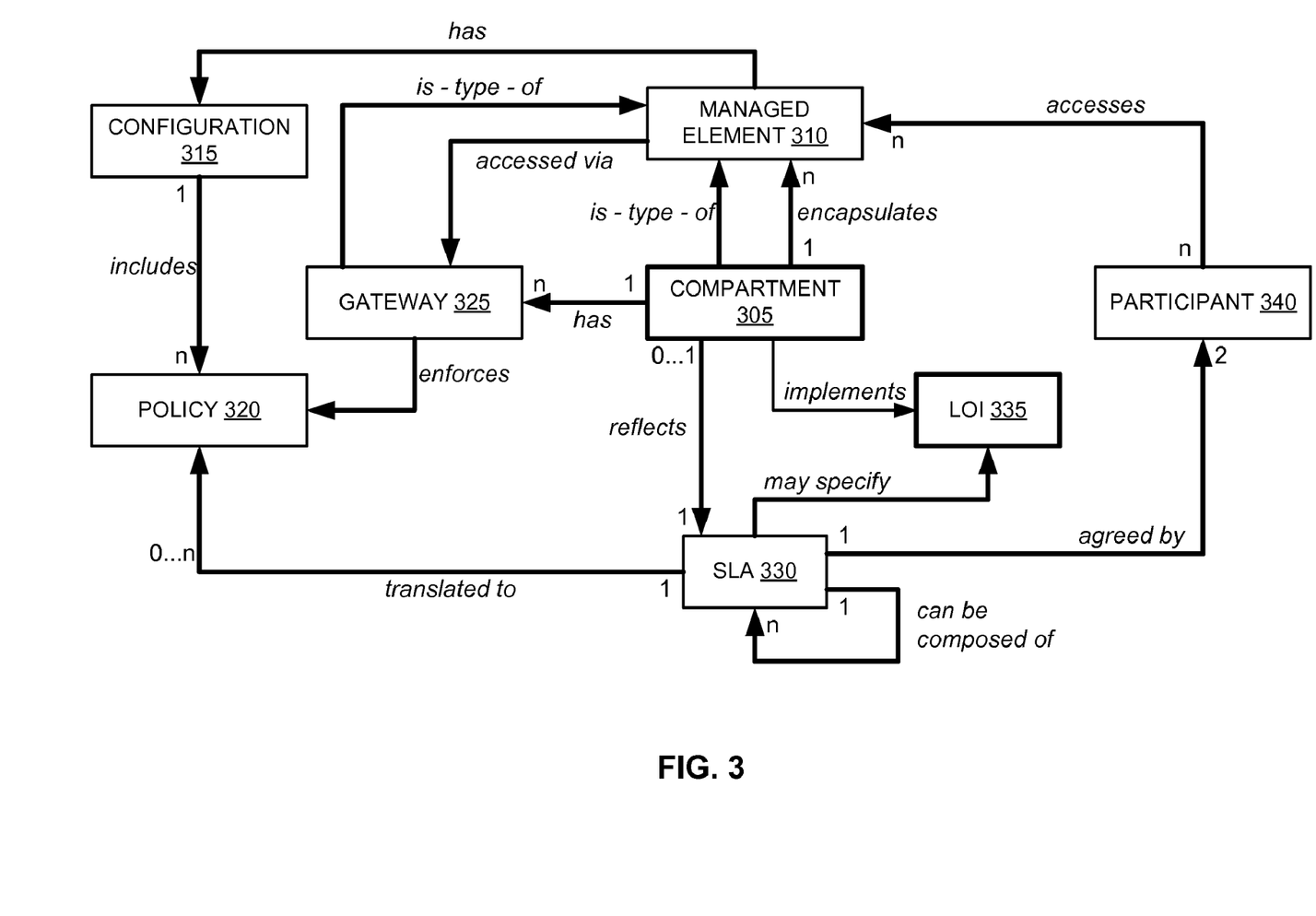
FIG. 3 is a block diagram of an embodiment of the invention that shows a compartment model for autonomic provisioning with isolation requirements.

FIG. 3 is a block diagram of an embodiment of the invention that shows a compartment model for autonomic provisioning with isolation requirements. A compartment is an architectural representation of the isolation concept. Compartment 305 can be characterized as data center 100. Compartment 305 maintains a registry with managed elements including other compartments. Managed element 310 is part of these managed elements. Compartment 305 encapsulates managed element 310. Managed element 310 includes configuration 315. Configuration 315 includes a number of policies such as policy 320. Policy 320 permits access to operations on managed element 310. Managed element 310 can be accessed by gateway 325. Access is granted only if policy 320 permits this operation. Compartment 305 may have a number of gateways such as gateway 325. Policy 320 represents SLA 330. SLA 330 specifies a level of isolation 335. LOI 335 is implemented by compartment 305. SLA 330 is agreed by participant 340. Participant 340 has access to managed element 310.

Compartment 305 is a subclass of managed element 310 class. Compartment 305 implements a management interface for managed element 310. The management interface includes, for example, the following methods: 1) "init" that initializes an instance of managed element 310 with a set of variables of configuration 315; 2) "start" that deploys managed element 310, creates a registration in the registry of its encapsulating compartment 305 and makes it available for usage; 3) "stop" that disables the availability of managed element 310 but does not remove it from the registry; 4) "terminate" that removes properties and state of managed element 310 from the registry; 5) "check-health" that checks predefined parameters of managed element's 310 state for compliance with a set of terms defined in SLA 330; and 6) "set-config" that adjusts configuration 315 of managed element 310 to an updated set of variables.

Multiple compartments provide the same logical operational interface but vary with respect to their internal implementation and guaranteed protection against SLA violation in accordance with the LOI specified in the SLA. Managed elements isolated by the same compartment are governed by the same SLA and share the same namespace. The following security principles are implemented: 1) confidentiality—data maintained by managed element 310 in compartment 305 cannot be read outside the compartment 305 without having a secret stored in the compartment 305; 2) integrity—operations performed on data maintained by managed element 310 in compartment 305 must be verifiable with keys known and trusted in the compartment 305; 3) access control—access to operations on managed element 310 in compartment 305 from external managed element or participant 340 can be granted only if there is explicit policy (e.g. policy 320) that permits this operation; 4) fail independence—failure of managed element 310 in compartment 305 do not cause managed element of another compartment to fail; and 5) non-interference—data exchanges and interactions several managed elements in compartment 305 cannot be externally monitored, unless there is an explicit policy (e.g. policy 320) that allows this.

Policies are of the format: <subject, target, function, constraint>. "Subject" is either managed element 310 or participant 340 that initiates an access request. "Target" is the managed element 310 targeted by an access request. "Function" is the operation or action on interface or state of a "target". "Constraint" is a constant or logical expression that defines under what condition the "subject" can perform the "function" on the "target".

Different compartments can be compared when making provisioning decisions. For example, customer_1 205 and customer_2 210 may want to have the same application and data hosted but pay for different level of isolation. Customer_1 205 may demand entire building_1 115 of data center 100 to be reserved, while customer_2 210 may want to pay only for having a virtual machine 235 for his or her applications and data. Although these two requests are different in respect to resources, they can be treated in the same manner. That is, regardless of if compartments are physical or logical, the provisioning process performs only the operations specified in their managed elements or compartment class interfaces.

Figure 4:
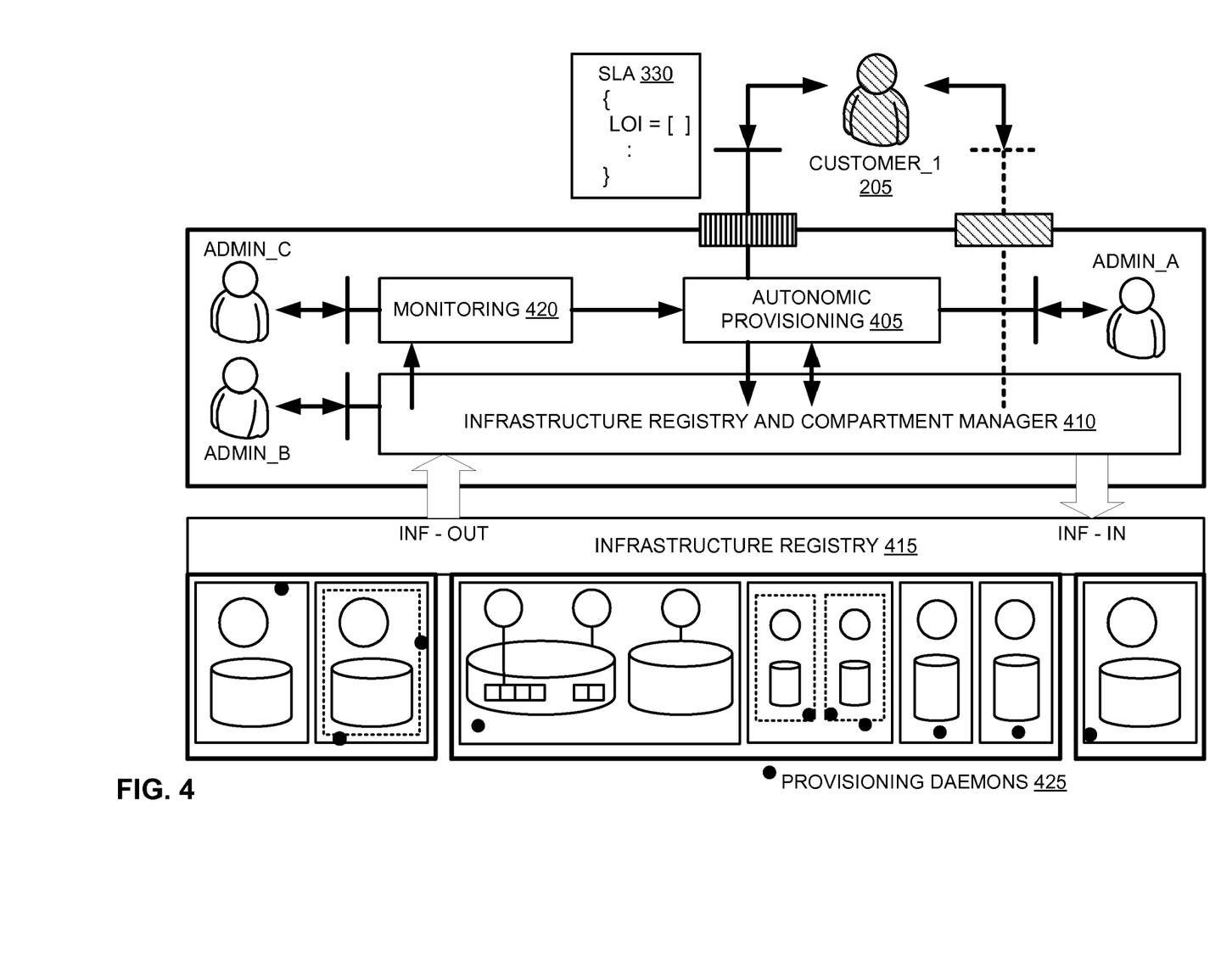
FIG. 4 is a block diagram of an embodiment for autonomic provisioning that shows technical system architecture for realizing the LOI concept using the compartment model.

FIG. 4 is a block diagram of an embodiment for autonomic provisioning that shows technical system architecture for realizing the LOI concept using the compartment model. A compartment that represents a specific level of isolation of resources can be provisioned after a customer and data center have negotiated what SLA violation risks the customer perceives, what the customer is prepared to pay, and what technical infrastructure resources the data center can provide. Depending on the data center's architecture and the number of levels of isolation that can be identified for this architecture, the infrastructure options result in the same number of SLA templates. For example, if the levels of isolation are seven, then the SLA templates are also seven. For each SLA template, there is a configuration compartment template. The configuration compartment template, or just configuration template, defines a set of descriptions of a managed element and deployment procedures, according to the agreed SLA.

In one embodiment of the invention, the configuration compartment template represents a template that could be based on a schema description of a given configuration of a level of isolation. The configuration schema may include the following elements: 1) [ON <event>] that specifies a precondition before the configuration action can be performed; 2) DO <config-action> that specifies the identifier of the configuration action to be performed; 3) ON <compartment-uuid> that specifies the unique identifier of a provisioning daemon that is responsible for configuring a particular compartment, listenting on a specific, concrete machine interface or IP or port; 4) WITH <local-config-utility> that specifies the actual system name of the utility that is predefined in the configuration of the provisioning daemon for performing a configuration action; this should be done at the point where the provisioning daemon is installed; 5) USING <param-1, ..., param-n> that specifies the set of parameters used for a configuration action that must be valid entries for a specific utility; 6) [ON FAIL<fail-action|[THROW <event> TO <provisioning-daemon>]>] that specifies the action to be performed or event to be fired if a configuration action fails; and 7) [THROW <event> TO <provisioning-daemon>] that specifies the event to be fired on completion of a configuration action.

Referring back to the exemplary seven levels of isolation that can be defined for data center 100, and having in mind the configuration schema described above, the following example shows the configuration schema for LOI 1 according to an embodiment of the invention:

Do <create-dir> on <application-compartment-uuid> with <mkdir-utility> given <appsvr_path, namespace>

Do <add-users> on <spatial-compartment-uuid> with <router-config-utility> given <ip-address, router-interface, port-numbers[ ]>

Do <add-objects> on <appsvr_path> with <copy> given <object_repository\object_names>

In this example, a directory is created by a particular provisioning daemon on a machine with given name and path; users are added to a router configured for this machine that can be accessed via a given Internet Protocol address, interface, and port; and objects are added to the created directory on the machine.

There also may be other templates available depending on the needs of the customer. There are three phases in the process of autonomic provisioning of infrastructure resources: negotiation, infrastructure resource selection, and incident response. Administrator_A, administrator_B, and administrator_C can be involved in these phases correspondingly. The negotiation phase includes determining the infrastructure resources, level of isolation, and the costs for these resources to fulfill customer's requirements. Administrator_A may be involved to load a negotiation strategy and offer a SLA with different LOIs to customer_1 205. Customer_1 205 selects a particular level of isolation and defines this level in a service level agreement (SLA) 330 with data center 100.

The LOI is presented as an additional term in the SLA 330. The SLA 330 with the corresponding LOI is provided to data center 100. Autonomic provisioning service 405 of data center 100 determines the compartmentalization required to achieve the SLA. Autonomic provisioning service 405 queries infrastructure registry and compartment manager (IRCM) 410 for a set of heterogeneous resources required by the SLA. The IRCM 410 checks infrastructure registry 415 to verify that the set of resources are present. Infrastructure registry 415 sends a response to IRCM 410 if the resources are available or not. The response is then sent to the provisioning service 405. Data center 100 confirms to customer_1 205 that the selected level of isolation is feasible if the resources are available in the infrastructure registry 415. If the resources are not available, the data center 100 can find a way to ensure these resources by archiving old data or obtaining new resources.

When the required infrastructure resources are present, autonomic provisioning service 405 selects a configuration compartment template for the corresponding LOI. Autonomic provisioning service 405 sends the selected configuration template to IRCM 410. IRCM 410 provides a common management interface to the set of heterogeneous resources. According to the received configuration template, IRCM 410 allocates the set of resources in infrastructure registry 415.

IRCM 410 sends notification to monitoring unit 420. Monitoring unit 420 uses a plurality of provisioning daemons 425 to monitor the infrastructure resources. Provisioning daemons 425 collect information about the infrastructure's state and capacity. The provisioning daemons 425 run and listen in the background, awaiting commands from the provisioning service 405. Each provisioning daemon has platform specific logic installed for executing the specification of compartment configuration templates according to the level of isolation (LOI). Monitoring unit 420 filters the collected information and creates health check and compliance events on resources, depending on the types of applications hosted by data center 100. The health check and compliance events are of the form <compartment, LOI, hw-flag>, where "flag" indicates whether or not the current physical host is in healthy state. The collected information is sent to the provisioning service 405.

When the set of heterogeneous infrastructure resources are allocated, a compartment model of the corresponding level of isolation is created. The lifecycle of the compartment begins with setting up, instantiation, and activation of the compartment. The setting up includes enabling security roles, access control, and other configuration parameters on the resources. When the compartment is completely instantiated and activated, a service endpoint to its gateway is generated and customized for customer_1 205.

Customer_1 205 may have multiple compartments and may change the SLA on an existing compartment. This may include changing the LOI of one or more components in the original agreement, resulting in possible migration and readjustment of the managed elements supporting the compartment.

The LOI concept and compartment model support four main objectives: self-configuration, self-optimization, self-healing, and self-protection. Self-configuration refers to the automated configuration of components and systems based on high-level policies. Self-optimization refers to the continuous, systematic improvement of performance and efficiency. Self-healing refers to detection and repair of localized software and hardware problems. Self-protection refers to automatic alerts and defense against malicious attacks and propagating failures.

Figure 5:
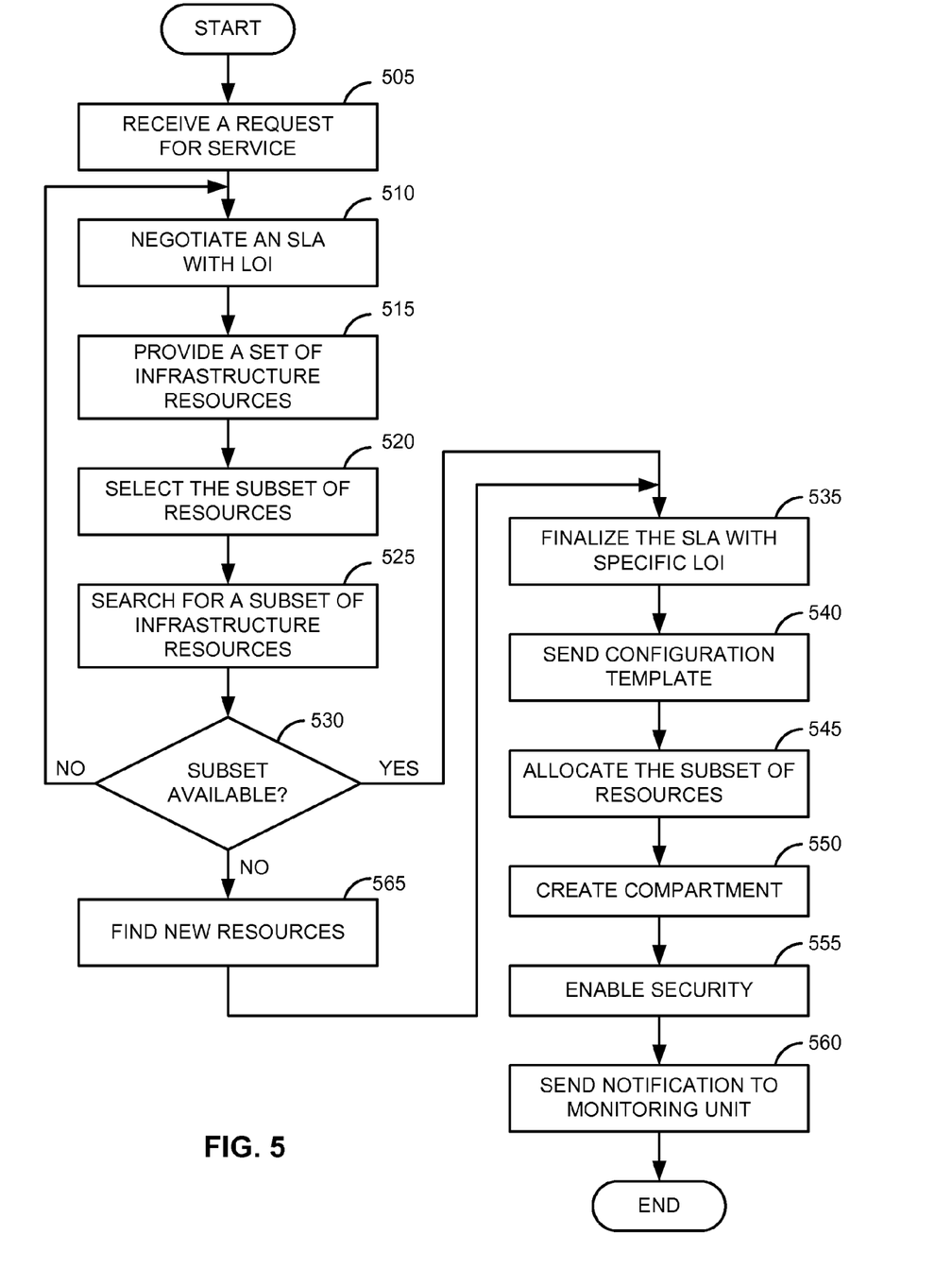
FIG. 5 is a flow diagram of an embodiment for allocating resources in a data center for hosting applications and data.

FIG. 5 is a flow diagram of an embodiment for allocating resources in a data center for hosting applications and data. At block 505 a customer request is received at data center 100 for hosting applications and data. At block 510, the data center 100 and the customer (e.g. customer_1 205) negotiate a service level agreement (SLA). The service level agreement defines a plurality of terms such as the level of isolation term. At block 515, the data center 100 provides a set of infrastructure resources. The customer can select a LOI among several levels of isolation, as each level corresponds to a specific configuration of resources. The level of isolation (LOI) provides secure protection on the customer's application and data in exchange for agreed costs.

At block 520, customer_1 205 selects a particular LOI and the resources needed to fulfill the SLA. A search is performed on the infrastructure resources at block 525 to check availability. At decision block 530, an autonomic provisioning service determines if a subset of the set of resources is available. If the resources are not available in the infrastructure registry 415, the process continues at block 565 or at block 510. The process continues at block 565 if the data center 100 can obtain new resources via archiving old data or purchasing new resources. The process continues at block 510, if the data center and the customer decide to negotiate a new SLA.

Referring back to decision block 530, if the resources are available in the data center, the process continues at block 535. At block 535, the customer and the data center finalize the negotiation of the SLA. The selected LOI is confirmed along with the corresponding subset of resources. The resources are defined in a configuration template.

At block 540, the configuration template is sent to an infrastructure registry and compartment manager (IRCM) 410. At block 545, the IRCM 410 allocates the subset of resources in the registry.

In an embodiment, when the subset of infrastructure resources is allocated in the registry of the data center, a compartment is created at block 550. The compartment is an architectural representation of the selected and implemented level of isolation. At block 555, security roles, access control and entry points to the resources are created and enabled. Then, at block 560, the IRCM 410 sends notification to a monitoring unit 420 that the compartment with the corresponding resources is created.

Elements of embodiments may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program, which may be transferred from a remote computer (e.g., a server) to a requesting computer (e.g., a client) by way of a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computing system comprising:
    an infrastructure registry to provide a set of heterogeneous infrastructure resources;
    an autonomic provisioning service unit to determine a subset of the set of heterogeneous infrastructure resources, to fulfill a service level agreement with a level of isolation and to select a configuration template for the level of isolation, wherein the level of isolation is defined to isolate and protect a resource from the subset of the set of heterogeneous infrastructure resources against a service level agreement violation;
    an infrastructure registry and compartment manager to allocate the subset of the set of heterogeneous infrastructure resources in the infrastructure registry to host applications and data according to the selected configuration template; and
    a monitoring unit to collect information about the subset of the set of heterogeneous infrastructure resources and send the collected information to the autonomic provisioning service unit.

2. The computing system of claim 1, wherein the infrastructure registry and compartment manager provides an interface to manage the subset of the set of heterogeneous infrastructure resources.

3. The computing system of claim 1, further comprising:
    a plurality of configuration templates, wherein each of the plurality of configuration templates corresponds to a different level of isolation.

4. The computing system of claim 1, further comprising:
    a provisioning daemon to monitor one of the set of heterogeneous infrastructure resources and listen for commands from the autonomic provisioning service unit.

5. The computing system of claim 1, further comprising:
    a gateway unit to provide an access point; and
    a unit including a plurality of policies that restrict the access point of the gateway unit.

6. The computing system of claim 1, wherein the autonomic provisioning service unit further comprises an interface for negotiation of a plurality of terms of the service level agreement.

7. A computer-implemented method comprising:
    receiving a request for provisioning of a set of heterogeneous infrastructure resources for applications and data hosting, wherein the set of heterogeneous infrastructure resources is included in an infrastructure registry;
    selecting a configuration template for the set of heterogeneous infrastructure resources, the configuration template to fulfill a service level agreement with a level of isolation term;
    sending the configuration template to an infrastructure registry and compartment manager to allocate the set of heterogeneous infrastructure resources; and
    allocating the set of heterogeneous infrastructure resources in the infrastructure registry based on the configuration template sent to the infrastructure registry and compartment manager.

8. The method of claim 7, further comprising:
    monitoring the set of heterogeneous infrastructure resources.

9. The method of claim 7, wherein the level of isolation term provides secure protection of data that resides on the set of heterogeneous infrastructure resources.

10. The method of claim 8, wherein monitoring comprises:
    collecting information about state and capacity of the set of heterogeneous infrastructure resources; and
    sending the information to an autonomic provisioning service.

11. The method of claim 10, further comprising:
    performing health checks and compliance events on the set of heterogeneous infrastructure resources.

12. The method of claim 7, wherein allocating the set of heterogeneous infrastructure resources comprises:
    creating a compartment in response to allocating the set of heterogeneous infrastructure resources;
    creating security roles, access control, and entry points to the set of heterogeneous infrastructure resources in the compartment; and
    sending notification to a monitoring unit that the compartment is created.

13. The method of claim 8 further comprising:
provide an interface for negotiation of a plurality of terms of the service level agreement.

14. A non-transitory computer-readable medium having instructions therein that when executed by a machine, cause the machine to:
receive a request for provisioning of a set of heterogeneous infrastructure resources for applications and data hosting;
select a configuration template for the set of heterogeneous infrastructure resources, the configuration template to fulfill a service level agreement with a level of isolation;
send the configuration template to an infrastructure registry and compartment manager to allocate the set of heterogeneous infrastructure resources; and
allocate the set of heterogeneous infrastructure resources based on the configuration template.

15. The computer-readable medium of claim 14 having instructions that when executed further cause the machine to:
monitor the set of heterogeneous infrastructure resources.

16. The computer-readable medium of claim 14, wherein the level of isolation provides secure protection of data that resides on the set of heterogeneous infrastructure resources.

17. The computer-readable medium of claim 15 having instructions that when executed further cause the machine to:
collect information about state and capacity of the set of heterogeneous infrastructure resources; and
send the information to an autonomic provisioning service.

18. The computer-readable medium of claim 17 having instructions that when executed further cause the machine to:
perform health checks and compliance events on the set of heterogeneous infrastructure resources.

19. The computer-readable medium of claim 14, wherein instructions causing the machine to allocate the selected set of heterogeneous infrastructure resources comprise instructions causing the machine to:
create a compartment in response to allocating the set of heterogeneous infrastructure resources;
create security roles, access control, and entry points to the set of heterogeneous infrastructure resources in the compartment; and
send notification to a monitoring unit that the compartment is created.

20. The computer-readable medium of claim 14 having instructions that when executed further cause the machine to:
provide an interface for negotiation of a plurality of terms of the service level agreement.

\* \* \* \* \*